United States Patent [19]

Hendry

[11] 4,155,969
[45] May 22, 1979

[54] METHOD FOR INJECTION FOAM MOLDING

[75] Inventor: James W. Hendry, Howell, Mich.

[73] Assignee: Ex-Cell-O Corporation, Troy, Mich.

[21] Appl. No.: 845,091

[22] Filed: Oct. 25, 1977

Related U.S. Application Data

[62] Division of Ser. No. 609,261, Sep. 2, 1975, Pat. No. 4,067,673.

[51] Int. Cl.² ............................................. B29D 27/00
[52] U.S. Cl. .................................... 264/45.1; 264/50; 264/328; 264/DIG. 83
[58] Field of Search .............. 264/DIG. 83, 45.1, 50, 264/328; 425/817 R, 4 R, 573

[56] References Cited

U.S. PATENT DOCUMENTS

| 3,437,722 | 4/1969 | Cronin et al. | 264/DIG. 83 |
| 3,531,553 | 9/1970 | Bodkins | 264/DIG. 83 |
| 3,891,362 | 6/1975 | DeVita | 425/573 X |
| 3,906,066 | 9/1975 | Barrie | 264/DIG. 83 |
| 3,941,529 | 3/1976 | Klingebiel | 425/4 R |
| 3,950,484 | 4/1976 | Egli | 264/DIG. 83 |
| 4,017,225 | 4/1977 | Hanning | 425/4 R |

OTHER PUBLICATIONS

Whittington, Lloyd R., "Whittington's Dictionary of Plastics", Stamford, Conn., Technomic, c1968, pp. 179–181.

*Primary Examiner*—Philip Anderson
*Attorney, Agent, or Firm*—Frank D. Risko; James H. Bower

[57] ABSTRACT

A method for the manufacture by foam molding of plastic products by first injecting into a mold non-cellular plastic resin and then injecting a foamed plastic resin of the same basic composition as the non-cellular plastic resin. The process and apparatus consisting of a single extruder and single injection chamber wherein the non-cellular and foamed plastic resin are extruded from the same extruder and stored in an accumulator until shot into the mold by a hydraulic cylinder. Controls are provided for the correct amount of each type of resin to be extruded and stored and the process can be adapted so that the sprue portion of the final product will be solid resin. By a simple addition, coloring of the resin may be accomplished so that the basic resin, method or apparatus will not require changes.

15 Claims, 8 Drawing Figures

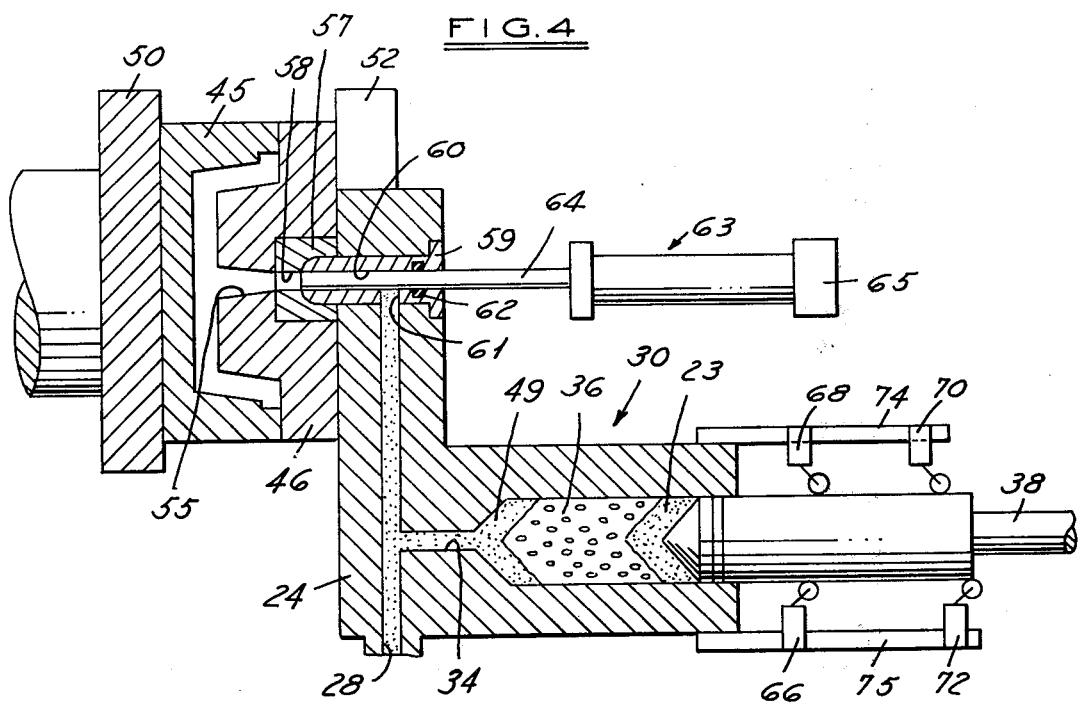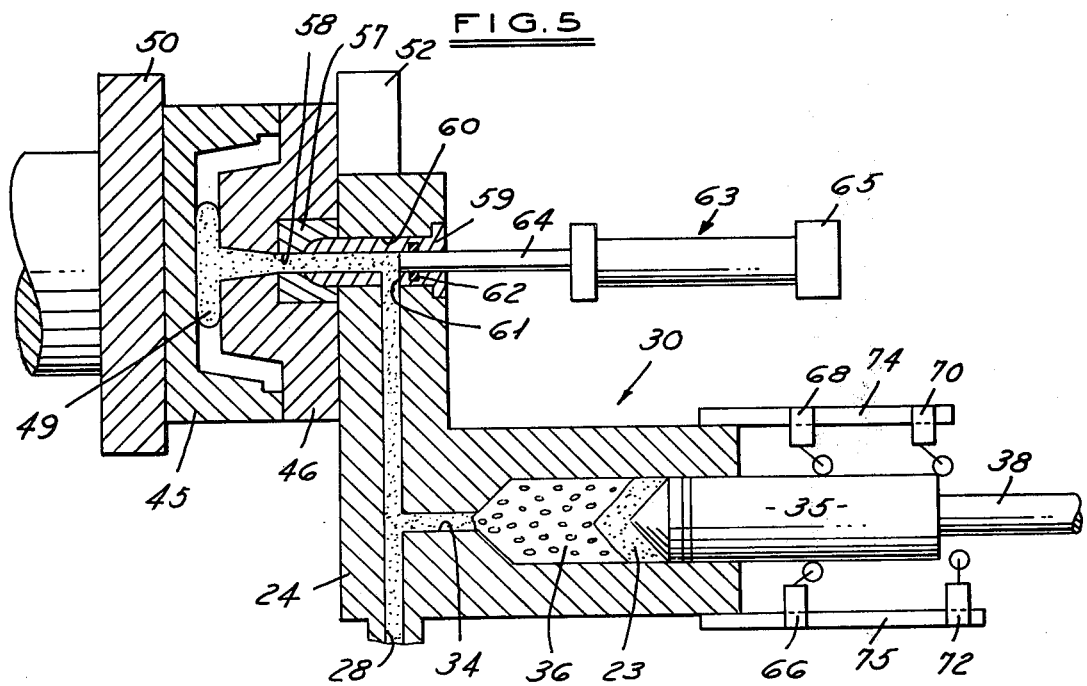

METHOD FOR INJECTION FOAM MOLDING

BACKGROUND

1. Field of Invention

This invention relates to the method for the manufacture of structural foam articles having a predetermined skin thickness and a foam interior from the same basic resin compound.

2. Description of Prior Art

The present method of manufacturing structural foamed articles consist chiefly of two type of methods and apparatus. In one method as set out in the Angell U.S. Pat. No. 3,268,636 a method is described wherein a blowing agent is mixed with a plastic resin and then extruded into an accumulator until the proper amount is collected and kept at a temperature and pressure to prevent foaming. A valve is then transferred which now connects the accumulator to a mold wherein the plastic resin is forced into the mold where it will foam and expand forming a cell-like structure. The external skin of the article is chilled faster than the inside and therefore will form a continuous surface without holes or blemishes. However, with this method it is very difficult to control the skin thickness since the whole method relies on the mixing of the foaming agent, the foaming action of the plastic mixture, the temperature and pressure of the accumulator and mold structure, and its temperature gradient during cooling.

In the other method of injection molding foam products described in the Garner U.S. Pat. No. 3,599,290, two extruders are used wherein each contains a different type plastic resin. Here one extruder will inject a plastic of one type material into the mold, then a valve is transferred and a second type plastic, which will foam, is extruded into the mold to form the internal structure of the article. The mold halves are then opened a controlled amount and the foamed internal structure will fully develop. Here the skin thickness can be controlled because a fixed amount of that particular plastic was available within the mold from the first extruder and the foam will continue to expand giving the desired cell structure as the mold is allowed to open. Both quantities of each type plastic extruded is controlled by the timing of the extruders during the injection process so that the skin thickness and ultimate density of the article is controlled on a repeatable basis. Although not a problem but rather an expense in this second method is the use of two extruders for the skin and core of the article. My invention overcomes this drawback by requiring only one extruder.

In the former example the skin thickness was uncontrolled because when the accumulator was connected to the mold, the plastic flow was virtually uncontrolled and therefore the skin thickness variation and the ultimate core cell structure is a function of many variables which can change from shot to shot. Here my invention establishes a fixed quantity of solid material which will fix the minimum wall thickness as the foamed plastic is injected into the mold.

SUMMARY

This invention utilizes a single plasticating extruder wherein a foaming agent is added by a nitrogen pump. The outlet of the extruder is connected to an auxiliary mixer and via a check valve to an injection chamber and from there to the mold. By operating the extruder with the nitrogen pump turned on, a steady stream of foamed plasticized material can be extruded into the injection chamber. After a specific volume is reached a switch will turn off the nitrogen pump and the unit will now extrude a non-cellular or homogeneous plasticized material until a second switch is tripped which will stop the extruder. The shut-off valve in the nozzle will now open and the extruded plasticized material in the injection chamber will be shot into the mold. The first portion to enter the mold cavity will be the non-cellular material and form the outer skin of the article to be produced, then the second portion of the accumulated material will enter the mold forming the cell-like internal structure of the article. The shut-off valve will now seal the nozzle and the cycle will be repeated.

The cycle of the apparatus can be operated such that a non-cellular material is at both the beginning and end of the shot. This will produce a non-cellular plastic sprue and allow a smooth finish at the break point of the sprue and article leaving a non-cellular material in the nozzle and passages available for the next article to be produced.

A static mixer following the extruder can be added as well as a liquid coloring pump so that the color of the plastic can be changed without completely changing the material in the hopper. This object will make color changes to the finished product more convenient and less costly.

Depending on the size of the part to be manufactured, additional sprues or runners can be added so that the material can be injected into the mold cavity simultaneously through more than one opening. Also the density of the part produced is a function of the volume or size of the pipes and bores in the system and an object of this invention is to consider these volumes as related to other elements in the system.

A further object is to allow the extruder to be shut off during periods of inactivity thus conserving power and energy as compared to most extruders used in this art which must be operated continuously. During the shot cycle of such continuously operated extruders, the material extruded is dumped overboard and discarded, or accumulated, reground, and then mixed in with virgin plastic. This procedure of dumping material is not necessary in my invention.

IN THE DRAWINGS

FIG. 4 is a view showing additional non-cellular plastic resin displacing injection chamber piston;

FIG. 5 is a view showing non-cellular material injected into mold from injection chamber;

DESCRIPTION

Figure 1:
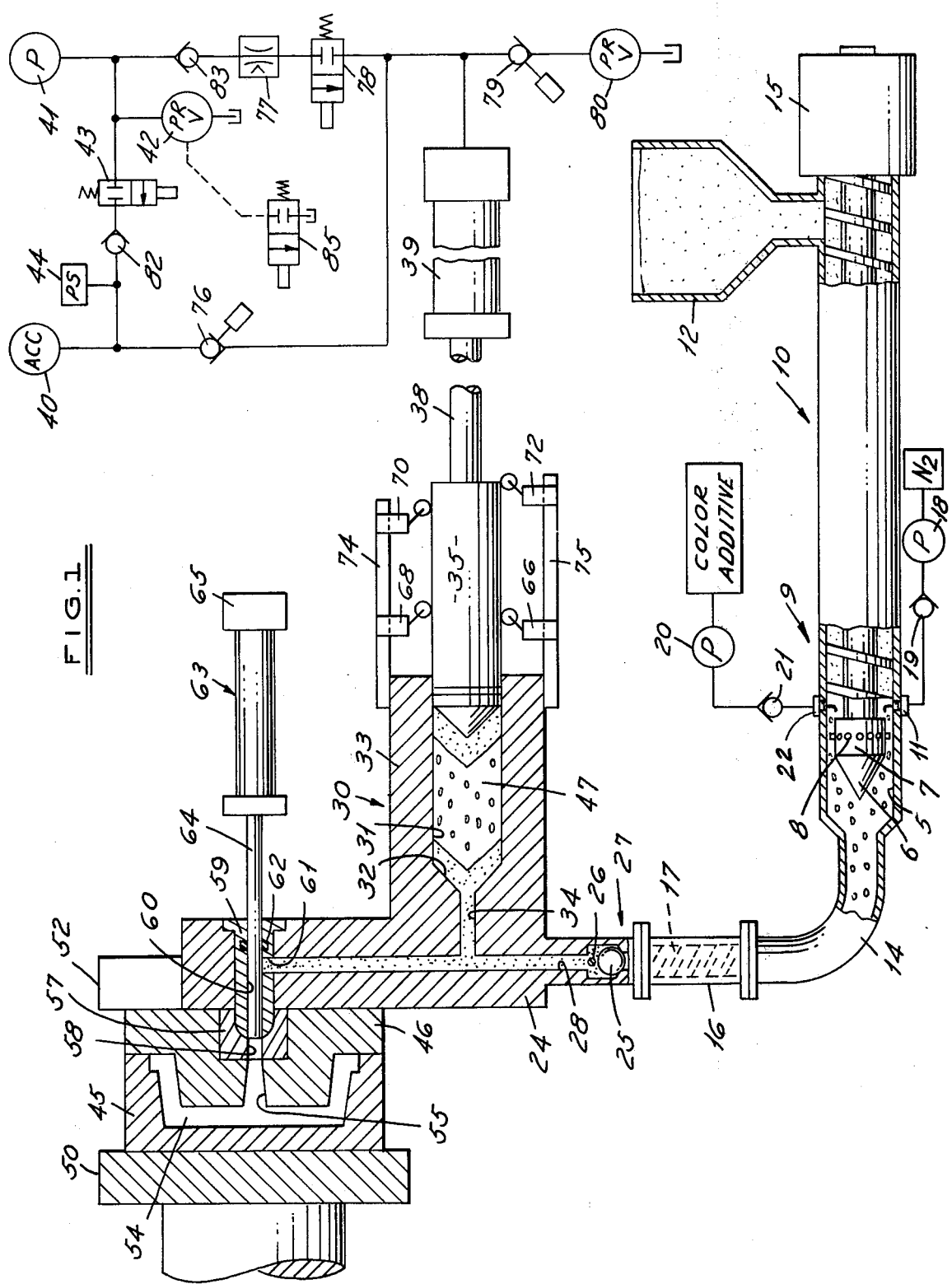
FIG. 1 is an overall partial section of the extruder, miser, piping, injection chamber and mold sections.

The overall apparatus of my invention can be viewed in FIG. 1 which shows a hopper 12 and an extruder 10 driven by a motor means 15 with the outlet of the extruder 10 connected by pipe 14 to a static mixer 16.

Near the outlet of the extruder 10 is a pump 18 having a fluid blowing agent source such as nitrogen connected to it. Some other type of blowing agents such as another gas or a liquid could be used in lieu of the nitrogen. Also connected near the outlet of the extruder 10 is a pump 20 having a source of fluid color additive available as well. The check valves 19 and 21 are associated with the blowing agent pump 18 and color additive pump 20 respectively. The flites on the extruder 10 are modified and fittings 11 and 22 are adapted to accept the inputs from the blowing agent and color additive pumps so these fluids enter the center of the melt stream. A plurality of fittings may be radially inserted for both the blowing agent and color additive to better distribute the fluids into the melt stream. The blowing agent source may also be in a plurality of input locations in front of and behind the location shown in FIG. 1 depending on the type of plastic and the size of the part to be produced. These locations would be in the front half of the extruder since a more rearward location could cause leakage of the blowing agent, if a gas, out of the hopper. Connected to the end of the extruder screw 9 is a torpedo-like structure having a frustoconical tip 6 and cylindrical section 7 having short pins or studs 8 extending radially around the circumference of the cylinder section 7 having a very close clearance to the inside diameter 5 of the barrel of the extruder. This torpedo-like element and its studs are a part of the extruder screw 9 and rotate with the screw causing a vigorous mixing of the melt as it exits the screw area or zone. This is in effect a dynamic mixer and is well known in the art.

The auxiliary optional mixer 16 contains a static element 17 which further mixes the plasticized resin with either the fluid blowing agent or the color additive or with them both.

The outlet of the mixer 16 is affixed to manifold 24 which contains a ball 25 and pin 26 at the inlet to form check valve 27, as disclosed in U.S. Pat. No. 3,806,291, into manifold bore 28. An injection cylinder 30 is shown housed in conjunction with the manifold 24 for convenience and could be a separate element connected by piping or tubing to the manifold. A bore 31 forms the inside diameter of the injection cylinder 30 having a conic surface 32 communicating from this bore to diameter 34 and thence to manifold bore 28. Closely fitting inside injection cylinder bore 31 is piston 35. The piston 35 is connected with piston rod 38 to plastic injection hydraulic cylinder 39. The volume bounded by conic surface 32, bore 31 and piston 35 form injection chamber 47.

Mold halves 45 and 46 are shown in FIG. 1 in a closed position held in place by the moving plate 50 and stationary plate 52 respectively of a typical clamp section of an injection molding machine.

The mold cavity 54 is connected to the sprue 55 to sprue bushing 57 through bore 58 and to nozzle 59 through nozzle bore 60. The sprue bushing 57 is affixedly held to the mold half 46 by any convenient means and the nozzle 59 is likewise affixedly held to manifold 24. Nozzle shut-off valve 63 is a hydraulically operated cylinder 65 with rod end 64 closely fitted into nozzle bore 60. Communicating with manifold bore 28 is cross bore 61 in nozzle 59 which intersects with nozzle bore 60 so that a continuous path from the plastic injection chamber 47 is made with the cavity 54 of the mold. A seal 62 in the nozzle 59 prevents leakage of plasticized material especially during the shot cycle.

Four limit switches 66, 68, 70 and 72 are located at the piston rod end of plastic injection chamber 47 and are affixedly held to the injection cylinder body 33 by rods 74 and 75. These switches are adjustable so that the correct amount of solid and foamed material can be injected for a given shot. These switches are connected to other electrical circuit elements such as relays or contactors so that proper signals and voltages can be delivered to operate properly in the correct timing sequence in the system. These switches are shown activated by the piston 35 but could be actuated by any convenient means signaling the various positions of the piston in the body of the injection chamber. For example a linear transducer could develop an electrical voltage proportional to distance and hence to volume which could be used in the same manner as the switches just shown.

The injection chamber hydraulic cylinder 39 is piped into the hydraulic circuitry and branches into three lines. One line is connected to a pilot operated check valve 79 and then to a pressure relief valve 80 which dumps to tank. The other two branches go to directional valve 78 and pilot operated check valve 76.

The hydraulic pump 41 is connected to a pressure relief valve 42 to tank and through a check valve 83 to a variable orifice 77 which connects to directional valve 78. A directional control valve 85 is connected to relief valve 42 and to tank to relieve pump 41 pressure after accumulator is charged. Another branch from pump 41 is connected to directional valve 43 through check valve 82 to pilot operated check valve 76. In parallel connections between the check valves 82 and 76 are a pressure switch 44 and a hydraulic accumulator 40. The pressure switch 44 may be connected to other electrical circuit elements for control purposes. The accumulator although appearing as a single element in the hydraulic system could have a plurality of hydraulic accumulators connected in parellel.

The sizes of the bores in the manifold 24 and injection chamber 47 as well as the size of the piping and bores from the nitrogen fitting 11 in the extruder to the mixer 16 and manifold 24 will be commensurate with the size of the foamed part to be produced and the ultimate density of the part. The part size itself is of course determined by the mold cavity 54 and a given shot size of the injection chamber 47, determined by either the full injection chamber volume or that set by the switches (66, 68, 70 and 72) associated with the injection chamber to control the function of the extruder 10 and nitrogen pump 20, will determine the final density of the part to be produced when considered in conjunction with the pipes and bores sizes between the various element in the system.

These bores and pipes or passages which connect from the fittings in the extruder to the injection chamber and from the injection chamber to the mold could represent a significant amount of the total volume of the injection chamber or in contrast a small portion of it. By way of example, if the total pipe volume as described is only 5% of the injection chamber volume, and assuming the plastic when unfoamed has a density of 1.00 and when fully foamed would have a density of 0.50, then the final minimum part density would equal 0.525 if maximum injection chamber volume is used. Obviously by injecting more non-cellular material the part density can be increased up to 1.00 which would be for a full non-cellular part and no foam. If the total pipe volume is 20% of the injection chamber size, with the same assumption as above, then the final minimum part density would equal 0.60 if maximum injector chamber volume is used. Still further if the pipe volume is 20% and only half of the injection chamber volume as controlled by the switches is used, the density would only go up to 0.70 since the pipe volume is now equivalent to 40% of the available injection chamber volume. The following table will show the pipe and bore volumes in terms of percentage of the injection chamber volume versus the part density using 1.00 as the non-cellular part density and using full volume of the injection chamber as the base and assuming only non-cellular material in the pipes and bores. The general range of thermoplastic densities are from 0.91 to 1.50 and the actual density desired for any given thermoplastic can be calculated from the table by multiplying the actual density of the thermoplastic by the density shown since this chart is set-up based on a thermoplastic density of 1.00.

| PIPE VOLUME | PART DENSITY |
| --- | --- |
| 5% | .525 |
| 10% | .55 |
| 15% | .575 |
| 20% | .60 |
| 25% | .625 |
| 30% | .65 |
| 40% | .70 |
| 50% | .75 |
| 60% | .80 |
| 70% | .85 |
| 80% | .90 |
| 90% | .95 |
| 100% | 1.00 |

Again it becomes very obvious that the total volume of the pipes and bores between the elements must be small in order to properly control the density of the part and the practical range for the volume of bores and pipe would be from nil, since it is impossible to have zero, to about 40%. The preferred and best range of pipe and bore volume would be from 5% to 25%. Here again, the number of nozzles, and size of the part will determine if the volume in the nozzles, pipes and bores become prohibitive from an economic and practical point which would require then that the injection chamber be changed to allow a reduced density of the part. Although only one nozzle is shown it is understood that a plurality of nozzles could be used.

MODE OF OPERATION

Figure 2:
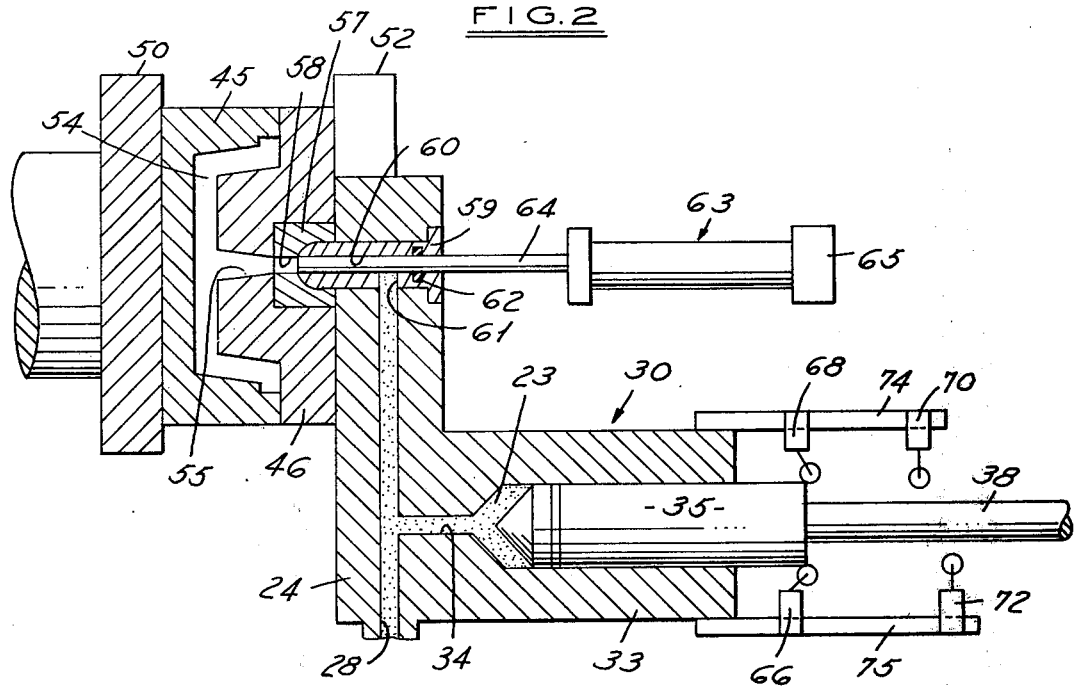
FIG. 2 is a view showing non-cellular plastic resin displacing injection chamber piston.
Figure 3:
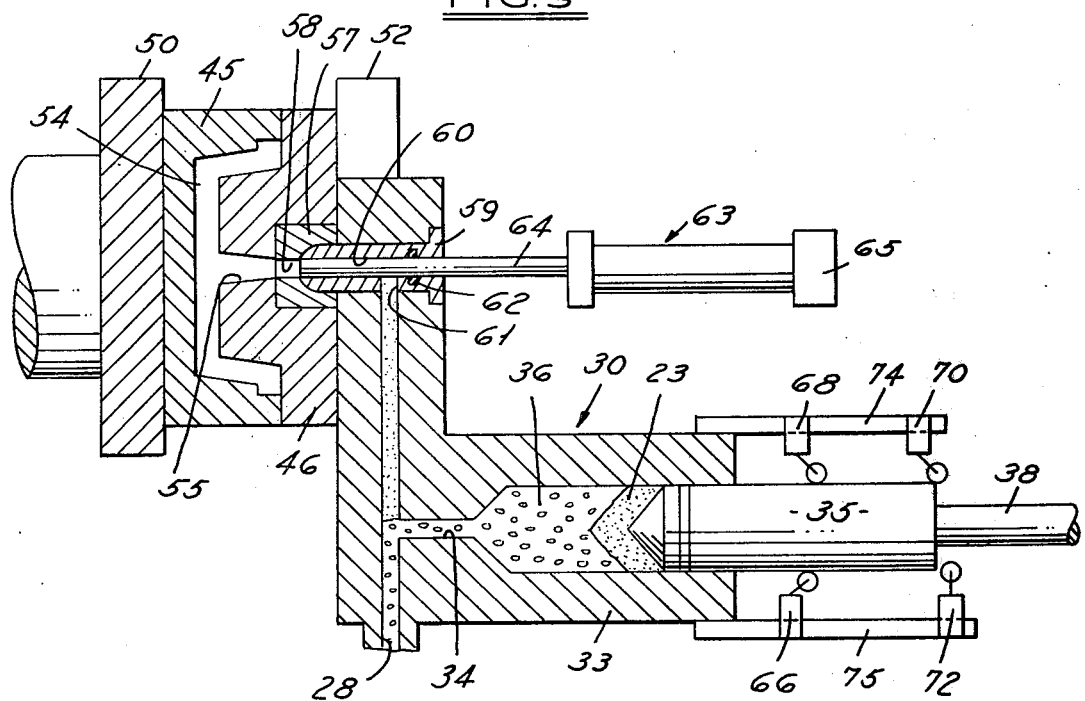
FIG. 3 is a view showing foamed plastic resin displacing injection chamber piston.

After an appropriate warm-up time so that heater bands associated with the extruder 10 and injection cylinder 30 would be up to temperature and other circuit elements have stabilized, the unit and system would be ready to operate. Hydraulic pump 41 would be turned on and directional valve 43 energized to port fluid into the accumulator 40. When this accumulator is fully charged, pressure switch 44 will de-activate directional valve 43 and the pressure will be trapped. Simultaneously directional valve 85 is energized venting pressure relief valve 42 and fluid would now be dumped at a lower pressure over relief valve 42 to tank. Pilot operated check valve 79 would now be opened and the relief valve 80 would be set to a variable pressure compatible with the polymer being plasticized to provide back pressure to injection cylinder piston 35. Extruder 10 would be turned on and would start to extrude plasticized resin into pipe 14 and through optional mixer 16 opening the check valve 27 at the end of the mixer and allowing the non-cellular resin to flow through manifold bore 28, bore 34 and into injection chamber 47 pushing back piston 35 allowing the non-cellular material to flow into the chamber bore 31 as shown in FIG. 2. When the correct amount of non-cellular material 23 is accumulated in the injection chamber 47 both limit switches 66 and 68 will be activated which will turn on pump 18; that will begin pumping a metered amount of blowing agent, in this case nitrogen gas, through check valve 19 and into the end of the extruder 10 where it will be forced into the melt stream, mixed and carried up stream through pipe 14 into the auxiliary mixer 16 where a static element 17 inside further mixes the resin and blowing agent together. The mixture of resin and blowing agent shown in FIG. 3 now continue to force the piston 35 back, filling the injection chamber 47 and at the same time the mixture 36 partially expands in the chamber with the amount of mixture 36 expansion controlled by the setting of relief valve 80, until the correct amount for the part to be molded is accumulated. At which time limit switch 70 is activated which now shuts off pump 18 and stops the metering of the blowing agent. Check valve 19 will prevent plasticized resin from coming into the pump 18 while the extruder continues to operate.

The extruder 10 continues extruding non-cellular material into the injection chamber 47 until limit switch 72 is activated which signals that a sufficient amount of non-cellular material 49 has been accumulated as seen in FIG. 4 and this also signals to shut off the extruder so that no further resin will be extruded or injected.

Figure 6:
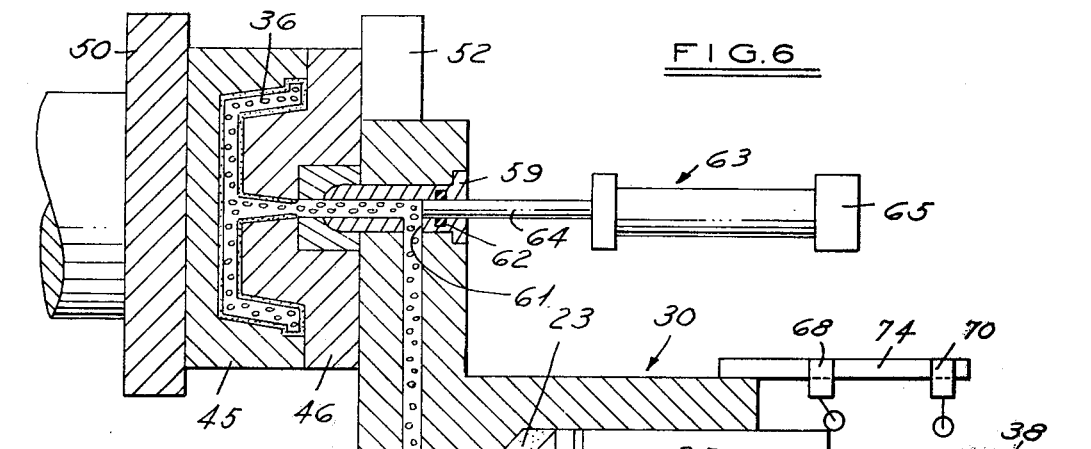
FIG. 6 is a view showing the foamed material injected into mold from injection chamber.
Figure 7:
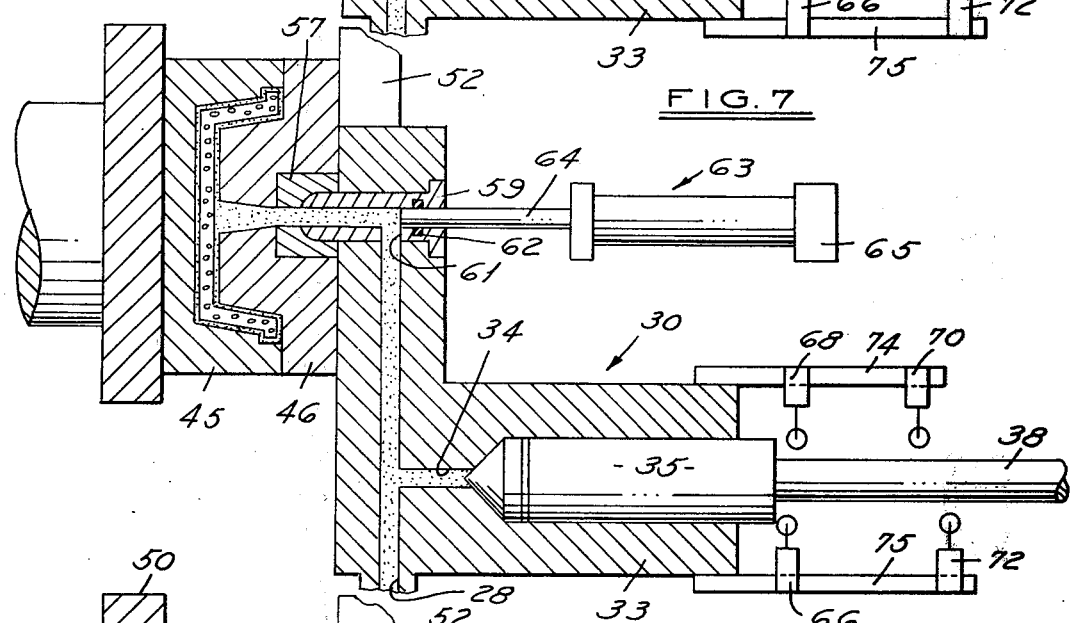
FIG. 7 is a view showing first extruded non-cellular plastic resin injected into mold.
Figure 8:
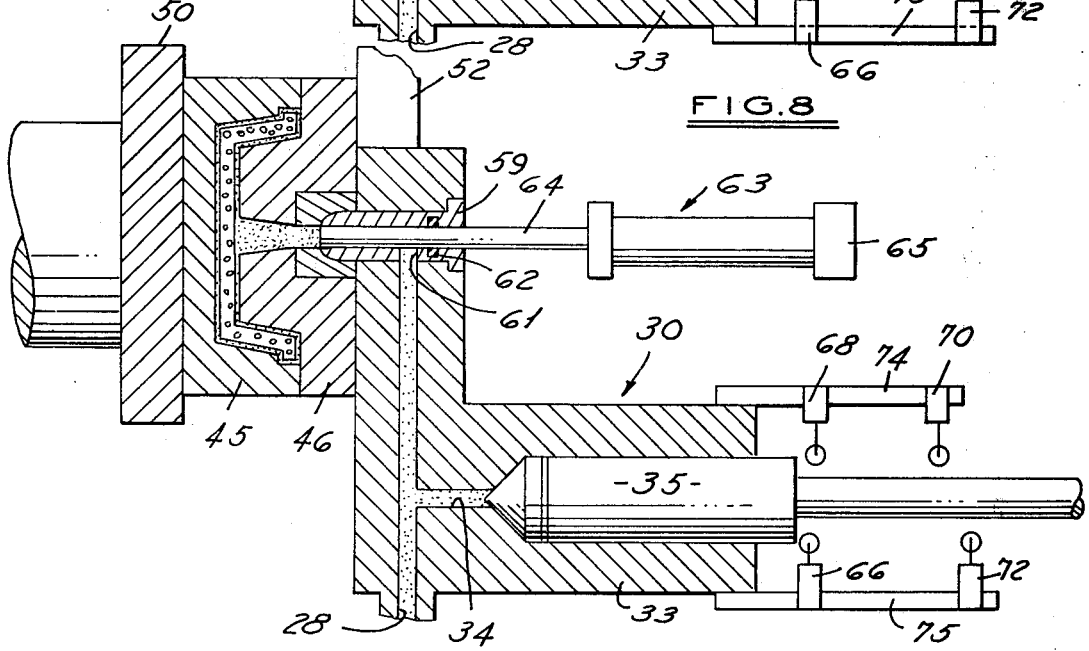
FIG. 8 is a view showing the nozzle shut-off and completion of the cycle.

Referring now to FIG. 1, the pilot operated check valve 79 will now be closed so that no fluid can flow over relief valve 80 and directional control valve 78 will be energized. With pump 41 still operating, fluid will flow through variable orifice 77 into the injection hydraulic cylinder 39 causing it to ease the piston 35 forward and the melt will close check valve 27 which will prevent any flow of resin back to the extruder. The nozzle shut-off valve 63 will open and allow the free flow of resin from the injection chamber 47 through diameter 34 intersecting with manifold bore 28 in line with cross bore 61 in nozzle 59 connecting to nozzle bore 60 through sprue bushing bore 58 into mold cavity 54 through sprue 55 in mold half 46, best shown in FIG. 5. The rod 64 of cylinder 65 will stop clear of bore 61 but in front of the seal 62 in nozzle to help prevent leakage of resin. Now with the piston 35 moving forward at a controlled velocity because of variable orifice 77, plasticized non-cellular resin 49 will now be forced into the mold cavity 54 formed by mold halves 45 and 46. A short time delay can occur to allow the outer skin of the plasticized resin 49 to firm up, then pilot operated check valve 76 will be energized and the stored fluid in the hydraulic cylinder 39 will cause piston 35 to shoot the foamed mixture 36 into the mold as shown in FIG. 6 causing it to flow into the center of the previous non-cellular melt pushing it into the far reaches of the mold cavity without disrupting the firmed up outer skin and causing the part molded now to have a solid laminar outer surface structure with a finite thickness and a foamed or cellular inner structure. If the process were stopped at this time, the part, after it comes out of the mold and was degated or had the sprue removed, would have a cellular structure at the sprue point that would be difficult to cover or would require some secondary manufacturing operation. To prevent this, the non-cellular material 23 which was extruded first into the injection chamber 47 will now be forced into the mold as shown in FIG. 7 which will fill the bores and passages with a non-cellular resin material which will cause the gate or sprue to be non-cellular. When this operation is complete, limit switch 66 will signal the completion of the shot and nozzle shut-off valve 63 will operate to shut off nozzle as shown in FIG. 8 and complete the cycle. While the molded part is cooling, the extruder 10 is now turned on and the plasticizing cycle will start again. Also the accumulator 40 will be recharged with hydraulic fluid by operating the directional control valve 43 and that portion of the cycle will start again. It is obvious that the various limit switches will be connected to other electrical circuit element so that the proper sequencing and time delays will be met in compliance with the part to be produced.

Pump 20 is shown in FIG. 1 connected to a color additive source which will allow coloring to be added to the melt. For example the whole part could be one color, or the skin of the part could be one color and the core of the part could be another color. This would operate in conjunction with check valve 21 which would open to allow the flow of color additive from pump 20 into the end of the extruder 10 and, when the pump is shut off, would prevent plasticized melt from flowing back up into the pump itself.

In summary, a single action extruder capable of plasticizing resin is piped to an injection chamber. Near the end of the extruder is connected a foaming agent source to input the foaming agent into the center of the melt stream in front of a mixer which will thoroughly distribute the foaming agent into the melt. By controlling the sequencing of the extruder and the foaming agent pump, the foamed resin is sandwiched in the injection chamber with non-cellular resin on each side. A unique fact is that the foamed resin is allowed to expand in the injection chamber prior to it being shot into the mold which reduces the need for holding the melt at a much higher pressure, as practiced in the art, prior to it being shot into the mold. Also by only operating the extruder when necessary and adding a foaming agent at the appropriate time in the cycle, the non-cellular and foamed plasticized resin can be extruder from a single extruder sequencially into the injection chamber and then shot into the mold.

It is apparent that changes may be made to the process and structure described without departing from the scope of the invention as sought to be defined in the following claims.

I claim:

1. A process for manufacturing resinous components having a dense non-cellular outer surface and a cellular inner structure comrising the steps of:
   a. first transferring a foamable resinous material from a plasticating extruder means into an injection chamber wherein partial volume expansion of said resinous material occurs;
   b. transferring next a non-cellular resinous material from said plasticating extruder means into said injection chamber, said non-cellular resinous material being of the same polymer composition as said firstly transferred material;
   c. discontinuing the transfer of the resinous material from said plasticating extruder means;
   d. establishing communication by a valve means between said injection chamber and a mold means;
   e. injecting first said lastly transferred non-cellular resinous material into said mold means at a controlled rate; and
   f. injecting next said partially foamed resinous material rapidly into said mold and terminating communication between said injection chamber and said mold means.

2. The process of claim 1 wherein a color additive pump disposes said additive into the resinous material and wherein a mixing chamber mixes said resinous material and said additive.

3. The process of claim 1 wherein said plasticating extruder means is restarted after said step of injecting said partially foamed resinous material.

4. A process for manufacturing resinous components having a dense non-cellular outer surface and a cellular inner structure comprising the steps of:
   a. first transferring a non-cellular resinous material from a plasticating extruder means into an injection chamber;
   b. transferring a foamable resinous material from said plasticating extruder means, said material beings of the same polymer composition as said firstly transferred mterial, into said injection chamber wherein partial volume expansion occurs;
   c. transferring next a second amount of non-cellular resinous material from said plasticating extruder means into said injection chamber;
   d. establishing communication by a valve means between said injection chamber and a mold means;
   e. injecting said lastly transferred resinous material into said mold means at a controlled rate;
   f. injecting said partially foamed resinous material and said firstly transferred non-cellular material rapidly into said mold; and
   g. terminating communication between said injection chamber and said mold means.

5. The process of claim 1 wherein a delay occurs after said first injection step.

6. The process of claim 4 wherein a delay occurs after said injection of said lastly transferred resinous material.

7. The process of claim 4 wherein said plasticating extruder means is stopped after the step of transferring said second amount of non-cellular resinous material.

8. A process for manufacturing resinous components having a dense outer surface and cellular inner structure comprising the steps of:
   a. transferring a foamable resinous material from a plasticating extruder means into an injection chamber wherein a partial volume expansion occurs;
   b. selectively stopping said plasticating extruder means and thus discontinuing the transfer of said foamable resinous material;
   c. establishing communication between said injection chamber and a mold means;
   d. injecting said partially foamed transferred resinous material into said mold means at a controlled rate and allowing said partially foamed resinous material to complete expansion in said mold means; and
   e. cooling said mold means and discontinuing said communication between said injection chamber and said mold means.

9. The process of claim 1 wherein a blowing agent is selectively metered into the melt stream of the plasticated resin.

10. The process of claim 9 wherein said non-cellular resinous material is produced by terminating metering of said blowing agent into said melt stream.

11. The process of claim 4 wherein a blowing agent is selectively metered into the melt stream of the plasticated resin.

12. The process of claim 7 wherein said plasticating extruder means is restarted after said step of terminating communication between said injection chamber and said mold means.

13. A process for manufacturing resinous components having a dense non-cellular outer surface and a cellular inner structure comprising the steps of:
 a. transferring a foamable resinous material from a plasticating extruder means wherein a blowing agent is metered selectively into the melt stream of the plasticated resin;
 b. said foamable resinous material is transferred through a check valve means into an injection chamber means having a predetermined volume;
 c. selectively stopping said plasticating extruder means and selectively terminating the metering of said blowing agent;
 d. establishing communication between said injection chamber means and a mold means;
 e. said foamable transferred resinous material being injected into said mold means at a controlled rate and allowing said foamable resinous material to expand in said mold means wherein a non-cellular dense outer surface and a cellular inner structure are formed;
 f. upon completion of said injection step, said communication between said injection chamber means and said mold means is terminated;
 g. said plasticating extruder means and said blowing agent metering means are selectively restarted and foamable resinous material is transferred from said plasticating extruder means into said injection chamber means.

14. The process of claim 13 wherein said mold means is selectively chilled.

15. The process of claim 8 wherein said plasticating extruder means is selectively restarted following said cooling step.

* * * * *